US010698379B2

United States Patent
Walker et al.

(10) Patent No.: US 10,698,379 B2
(45) Date of Patent: Jun. 30, 2020

(54) NON-INVASIVE METHOD FOR DISPLAYING AND MONITORING PRACTICAL DATA IN CONTROLLERS

(71) Applicants: David R Walker, New Port Richey, FL (US); Thomas A Moulton, New Port Richey, FL (US); Goran Igic, New Port Richey, FL (US)

(72) Inventors: David R Walker, New Port Richey, FL (US); Thomas A Moulton, New Port Richey, FL (US); Goran Igic, New Port Richey, FL (US)

(73) Assignee: FACTS Engineering, LLC, New Port Richey, FL (US)

( * ) Notice: Subject to any disclaimer, the term of this patent is extended or adjusted under 35 U.S.C. 154(b) by 95 days.

(21) Appl. No.: 16/139,830

(22) Filed: Sep. 24, 2018

(65) Prior Publication Data
US 2019/0025791 A1     Jan. 24, 2019

Related U.S. Application Data

(63) Continuation-in-part of application No. 11/848,074, filed on Aug. 30, 2007, now Pat. No. 10,082,782.

(51) Int. Cl.
*G05B 19/05*    (2006.01)

(52) U.S. Cl.
CPC ......... *G05B 19/058* (2013.01); *G05B 19/054* (2013.01); *G05B 19/056* (2013.01)

(58) Field of Classification Search
CPC ... G05B 19/058; G05B 19/054; G05B 19/056
See application file for complete search history.

(56) References Cited

U.S. PATENT DOCUMENTS

| 2004/0189495 | A1* | 9/2004 | Wu | G05B 19/05 341/99 |
| 2008/0126665 | A1* | 5/2008 | Burr | G05B 19/4185 710/316 |

\* cited by examiner

*Primary Examiner* — Ernest Unelus
*Assistant Examiner* — Ronald T Modo
(74) *Attorney, Agent, or Firm* — Michael L. Greenberg, Esq.; Greenberg & Lieberman, LLC

(57) ABSTRACT

A device that provides for the non-invasive data monitoring of analog IO of a Programmable Logic Controller (PLC) system is described. The output is ultimately presented to a user audibly and/or visually on an interface in real-time and is measured directly from the IO channel. This type of device allows the accurate reading and analysis of errors and erroneous data within a device and transmission of said data to disparate secondary devices for use.

13 Claims, 4 Drawing Sheets

NON-INVASIVE METHOD FOR DISPLAYING AND MONITORING PRACTICAL DATA IN CONTROLLERS

CONTINUITY

This application is a Continuation-in-Part application of non-provisional patent application Ser. No. 11/848,074, filed on Aug. 30, 2007, and priority is claimed thereto.

FIELD OF THE PRESENT INVENTION

The present invention relates to a device that provides for the non-invasive data monitoring of analog IO of a Programmable Logic Controller (PLC) system. The output is ultimately displayed on a display interface, or relayed audibly via a speaker in real time, and is measured directly from the IO channel.

BACKGROUND OF THE PRESENT INVENTION

Programmable Logic Controllers (PLCs) are important and necessary elements when working with automated industrial processes. A major driving force in industry, and thus the economy as a whole, rests with industrial output. The front line of industry can then be regarded as the factories, where automated systems help mass-produce numerous products on assembly lines and other like systems. In order to accomplish industrial goals, it is crucial that automation is controlled properly. Making this even more important is the fact that factories often feature dusty and temperate conditions that can interfere with computers and other systems.

At the heart of this automation is the PLC. The general PLC is designed to withstand such conditions inside the factory in order to create a more effective automated environment. The PLCs function to utilize hardware and software capabilities to basically control the automated process. A central processing unit (CPU) generally interfaces with an input/output system (I/O module) to ultimately engage the controlling process through the additional use of sensors, switches and other devices. The output of this interaction within the PLC is crucial as timing, voltage current, and other factors must be at specification or the automation process will be off. Basically, if an output result is not responded to in a certain amount of time, the control will be off and thus will cause the entire overall automation process to be off and not in proper control.

In addition, analog I/O modules are vitally important to industry, as these elements to the PLCs are relied upon to measure such significant elements as motion, pressure, and temperature. In this regard, there is a significant need for a monitoring system that can directly and easily monitor the output numbers relating to the voltage and other factors of automation. In its most basic sense, this type of monitoring is used to ensure that everything is working properly.

Currently, most designs require meters or additional computer connections to determine whether the controller and consequently entire automation is running properly. These meters and additional computers employ a process where the PLC output gleaned from the sensors and I/O modules read the output for an item such as voltage. However, the meter and additional computer approaches require costly and invasive methods that delay the overall monitoring process. In addition, the meter and additional computer approach often require that parts be taken out of the overall component and transferred to the external monitoring device. This creates more issues as it can affect the quality of this vital reading. For example, a meter used to decipher digital output can actually cause a reading to change when placed near the circuits. Even a slight change in the reading can cause costly problems for the overall automation. It should be noted that removing covers and moving cables could affect monitoring. Current display methods involve this type of invasive activity, which perpetuates inherent issues of skewed data.

Because of these factors, there is a substantial need for a display and monitoring method that is non-invasive. By satisfying this need of a non-invasive monitoring method, such as is the case with the present invention, controllers and industrial automation in general will greatly benefit from this added safeguard related to the fact that a user can simply read the data without fiddling with vital elements of the control system.

Recognizing the importance of constant monitoring, some have incorporated attempts at providing better monitoring devices to the analog I/O modules. For example, light-emitting diodes (LED) have been attached that illuminate as an alarm system when something such as voltage output is off. However, this alarm system merely issues an alert and does not eliminate the typical requirement to intervene with the functionality of the PLC in order to establish a meter or additional computer for an output reading.

Currently, there is no way for a person in real time to physically view an analog I/O module and determine exactly what is being sent to the CPU of the PLC. Thus, there is a need for a device that contains a LCD-type element and/or a voice-based interface that actively displays (and/or audibly informs of) what has been converted and sent to the CPU in real time. This need is substantial because a device such as the present invention will allow a person to obtain data regarding the exact condition of the analog I/O module at any given time. This then will eliminate all the extraneous steps that are currently undertaken. This need is established with the present invention because a user can use it to view the digital data in counts, as well as in engineering units. By satisfying this need, automated industry will significantly benefit through the much more cost-effective and increased monitoring of the analog I/O module output.

U.S. Pat. No. 5,640,099 issued to Sanada on Jun. 17, 1997, is a method and apparatus for detecting a short circuit point between wiring points of a device. Unlike the present invention, Sanada employs costly elements such as laser beams to merely detect deficiencies and does not convert conditions such as voltage and temperature into digital data.

U.S. Pat. No. 5,058,052, issued to Sexton et al on Oct. 15, 1991, is a method for checking for errors in a PLC based on a predetermined list of possible deficiencies to be concerned about. When a deficiency is discovered, an error alert commences to inform a user that there may be a problem with the control. Unlike the present invention, Sexton is a relatively costly endeavor in that it integrates merely an alert mechanism to inform a user of a deficiency. The user must then take additional and invasive steps to determine the exact issue with the PLC instead of having the opportunity to quickly read a real-time display to determine the exact deficiency, as is the case with the present invention.

There is a distinct need to quickly and accurately detect output deficiencies in PLCs due to the strict timing and often rough conditions associated with the control of automated industrial elements. While alert methods certainly have the ability to let a user know of a problem, the fact remains that the problem either has already occurred or time must be taken to determine what exactly the problem is. A related issue to these alert methods is that they become costly in both additional material and time as an investigation of the potential deficiency is investigated. Thus, there is a need for a non-invasive device that can always be available to convert and send voltage or current signal into digital data counts or engineering units to the CPU and convey them to a user in real time.

The present invention satisfies that need and is significant in that it provides a cost-effective and practical method for quickly monitoring the progress of the controller output relating to an analog I/O module. At the same time, the present invention also is unique in the fact that it allows a user to monitor data without having to potentially compromise the results—even just a tiny bit—because of the non-invasive method of display and data presentation to the user.

Moreover, the present invention allows for the proper verification of a system at any time and in real time without the invasive need for fiddling with internal parts or cables. At the same time, most other PLC displays rely on intermediate elements throughout the system to compliment the function relating to the invasive methods of monitoring. Beyond the typical invasive problems, these intermediate systems sometimes interfere with the regular flow and process of the data. This problem sometimes leads to the corruption of data. The present invention, however, solves this problem by directly connecting the I/O card to the display interface, acting as a display reporting interface. This essentially cuts out the negative effects of these intermediate elements while also sparing the monitoring system of potentially data-skewing invasive procedures. For these reasons, there is a substantial need for the present invention.

SUMMARY OF THE PRESENT INVENTION

The present invention is a non-invasive method that permits a user to monitor vital information relating to a PLC by viewing a display interface, or by obtaining the vital information via a voice interface. The display and/or voice interface inherent in the form of at least one speaker and at least one microphone is directly connected to an I/O card. This vital information includes voltage output, pressure and temperature which is configured to be displayed on the display interface, or conveyed audibly via the at least one speaker. These elements of the automation process are detected via sensors built into the overall system. However, some embodiments of the present invention need not require an onboard microphone, but may employ a wireless connection to a device pre-equipped with a microphone, such as a mobile device.

The analog I/O module of the PLC, meanwhile, converts the output gleaned from these sensors into a digital value as it sends the information to the CPU. The present invention is non-invasive so that it can easily be used without having to delve deeper into the PLC system. Instead, the data is compiled in real time, and is transferred via the I/O card to the display interface and/or conveyed audibly to the at least one speaker. The user may then scroll through various menu options to determine and ultimately view desired data. Alternately, instead of manually scrolling, the user may employ voice cues to determine which data is presented audibly.

The present invention is a method that employs a display interface, preferably but not limited to LCD and/or at least one speaker and microphone, to actively and in real time display (and/or read aloud) exact information of what has been converted from the I/O card and sent to the CPU. In this manner, a user can instantly learn what the analog I/O module is doing at any given moment audibly or visually. This allows for instant reaction if the user needs to correct a potential deficiency.

The LCD of the present invention displays the value of the specific unit of measure being used at any given moment. This allows for the user to see digital data counts as well as engineering units such as volts, milliamps and temperature. As a corollary, the at least one speaker of the present invention is configured to audibly convey the same data values as relayed to the LCD, providing a hands-free mechanism by which the present invention may be used.

In an embodiment of the present invention, only one button is needed to view the relevant data. In addition, the LCD of the present invention permits the user to view multiple channels at one time. These elements of the present invention result in a cost-effective method of instant knowledge relating to the analog I/O output. In other embodiments of the present invention, no buttons are necessary, as all relevant data selection can be instructed via the voice of the user through the microphone. In such embodiments, buttons of a remote display and/or handheld display may be employed in lieu of a button directly on a fixed display to augment the display of data and menu manipulation.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PREFERRED EMBODIMENT

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
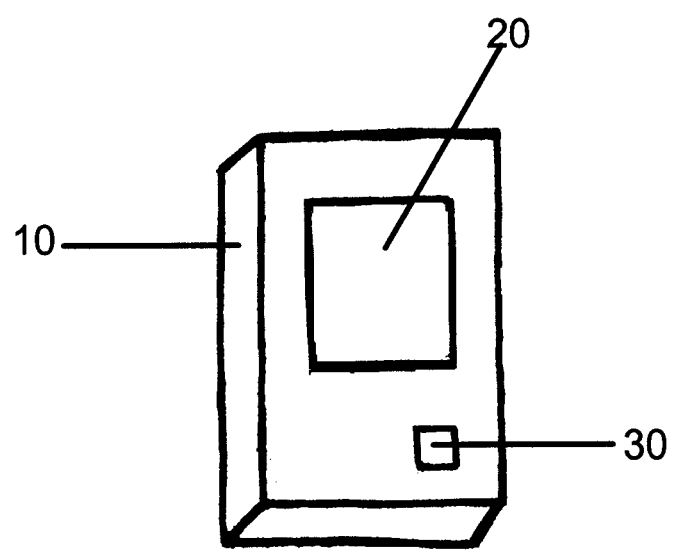
FIG. 1 is a front view of the display interface of the present invention.

FIG. 1 provides a view of a display interface (20) of the present invention, as it is located on a panel display casing (10). The display interface (20) as seen in FIG. 1 serves to display text in real time. This text displays everything ranging from the initial self-test upon powering up to fault messages. Beyond those functions, the display interface (20) provides real time numbers and text so that the user can instantly learn various conditions of the PLC. For example, a user monitoring the display interface (20) can view and instantly comprehend the data moving to the CPU because it also appears on the display interface (20) in engineering terms and/or relevant data counts. This means that a user may simply read the output emanating from an I/O card where he or she can quickly deduce exactly what is going on with the output and consequently, with the entire automation operation.

In addition, FIG. 1 shows that the display interface (20) is protected and surrounded by a panel display casing (10). There is no need to make invasive movements into the panel display casing (10) because all data is may be automatically displayed in real time on the display interface (20). Moreover, one aspect that minimizes cost and complexity in regard to the present invention is the panel button (30). Only one panel button (30) is necessary for a user to navigate the varying areas of relevant interest in regard to what is read on the display interface (20). Other preferred embodiments of the present invention may omit the panel button (30), employing an interface without any buttons. Additionally, it should be understood that the display interface (20) of the present invention may be a remote display. A display interface (20) of the present invention configured as a remote display may include, but is not limited to a remote machine connection, a computer, a laptop computer, a mobile device, a cart-based display, or other conventional display mechanism. In such cases, one or more buttons of the remote display may be employed to manipulate menus and alter the view of data depicted on the display interface (20).

Figure 4:
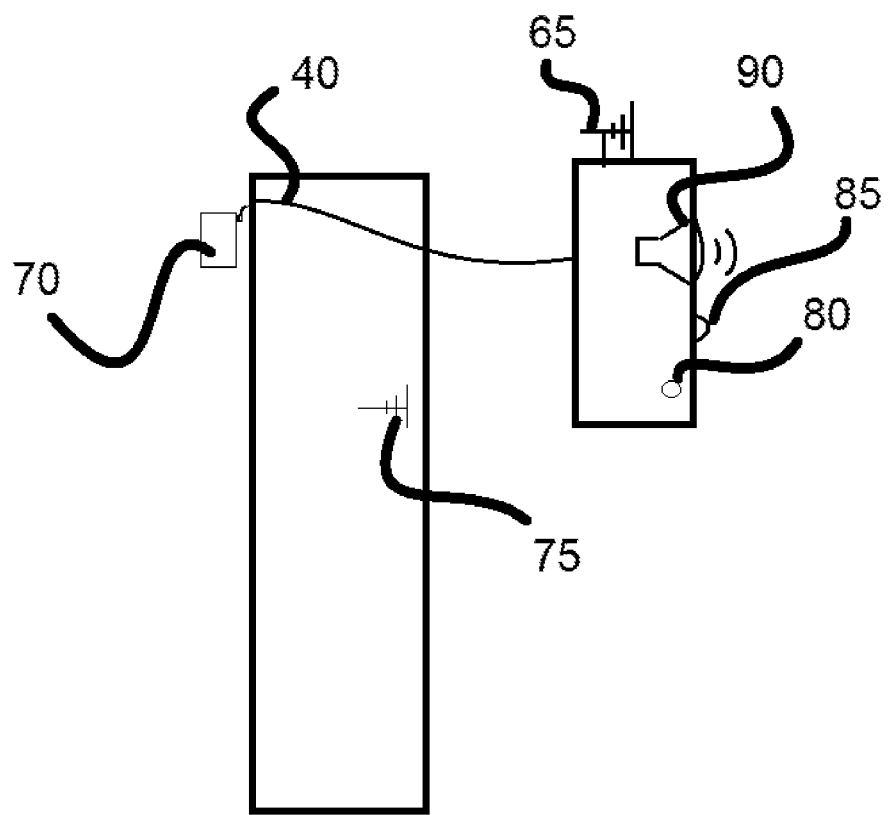
FIG. 4 depicts components of a wireless embodiment of the present invention as established for voice-based menu manipulation, and speakers to convey relevant data audibly.

As depicted in FIG. 4, such an interface preferably employs a microphone (80) and at least one speaker (90) to provide a mechanism by which a user may provide voice instructions to facilitate manipulation of the interface and data displayed or conveyed audibly via the at least one speaker (90). However, some embodiments of the present invention need not require an onboard microphone, but may employ a wireless connection to a device pre-equipped with a microphone, such as a mobile device.

In another preferred embodiment, the alternate interface of the present invention may be equipped with an external antenna (65) in communication with a handheld display. The external antenna (65) is configured to receive data from, and transmit data to, an internal antenna (75) disposed in communication with the I/O card of the present invention. It should be understood that the external antenna (65) and the internal antenna (75) may employ various low-power mechanisms, including, but not limited to RF transmission, Bluetooth™, RFID, ISM Band, and/or infrared. However, in the case of infrared, it should be understood that an LED bulb (85) is employed to transmit and receive data.

After powering up the overall device, the panel button (30) can function as the sole navigational tool for the display interface (20). For example, if a user wants to be presented with data in voltage units, the user would click and hold down the panel button (30) as the display interface (20) scrolls through various primary menu items such as setup and display. Alternately, the user may instruct the present invention with his/her voice to indicate the preferred units in which the data is presented, as well as to scroll via a voice command. Once the user reaches a menu item that he or she would like to move forward with, the user simply releases the panel button (30), or provides voice instructions to proceed. Once the panel button (30) is released by the user, the display interface (20) displays secondary screens serving as sub-displays to the primary menu item that was selected by releasing the panel button (30). If the user wishes to view data in voltage units, then he or she would release the panel button (30) from the primary menu scroll on the "display"—"units"—"+/−V"—"mA, V." By releasing the panel button (30) at this point, the display interface (20) will allow the user to view the secondary display screen where the user will press the panel button (30) (or provide voice instruction) each time he or she wishes to scroll to a new secondary display item. Ultimately, in the example above, the user will press and release the panel button (30) or provide advancement voice instruction until the relevant voltage units are being displayed in real time. It is the ability of the panel button (30) (or potentially button-less voice navigation) to effectively navigate through the various menus and text options of the LCD panel display (20) that saves space and becomes more efficient.

Figure 2:
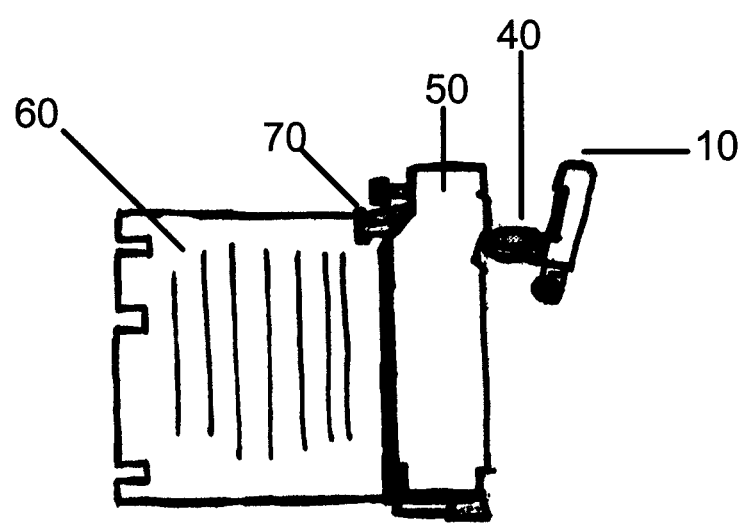
FIG. 2 is a top view of the display interface of the present invention

In FIG. 2, a top view of the present invention is depicted in terms of placement of the panel display casing (10) in relation to the PLC casing (50). The display interface (20) is directly connected to the I/O card (60) through conventional means. The reason the display interface (20) is in direct communication with the I/O card (60) is to eliminate the need for intermediate elements that can potentially corrupt data. Instead, data flows directly from the I/O card (60) to the display interface (20) and/or to the at least one speaker (90) via transmission from the internal antenna (75) to the external antenna (65), (or may be transmitted wirelessly via infrared LED (85) to a remote display interface) preferably positioned in communication with the at least one speaker (90).

As seen in FIG. 2, wire connections (40) provide proper data conduits between the display interface (20) and the I/O card (60) of the PLC. These wire connections (40) are connected at a conventional connection point as shown in FIG. 2. Data transferred through the wire connections (40) to the display interface (20) via the conventional circuit board (70) work together to provide the real time data in their respective units of the present invention.

Figure 3:
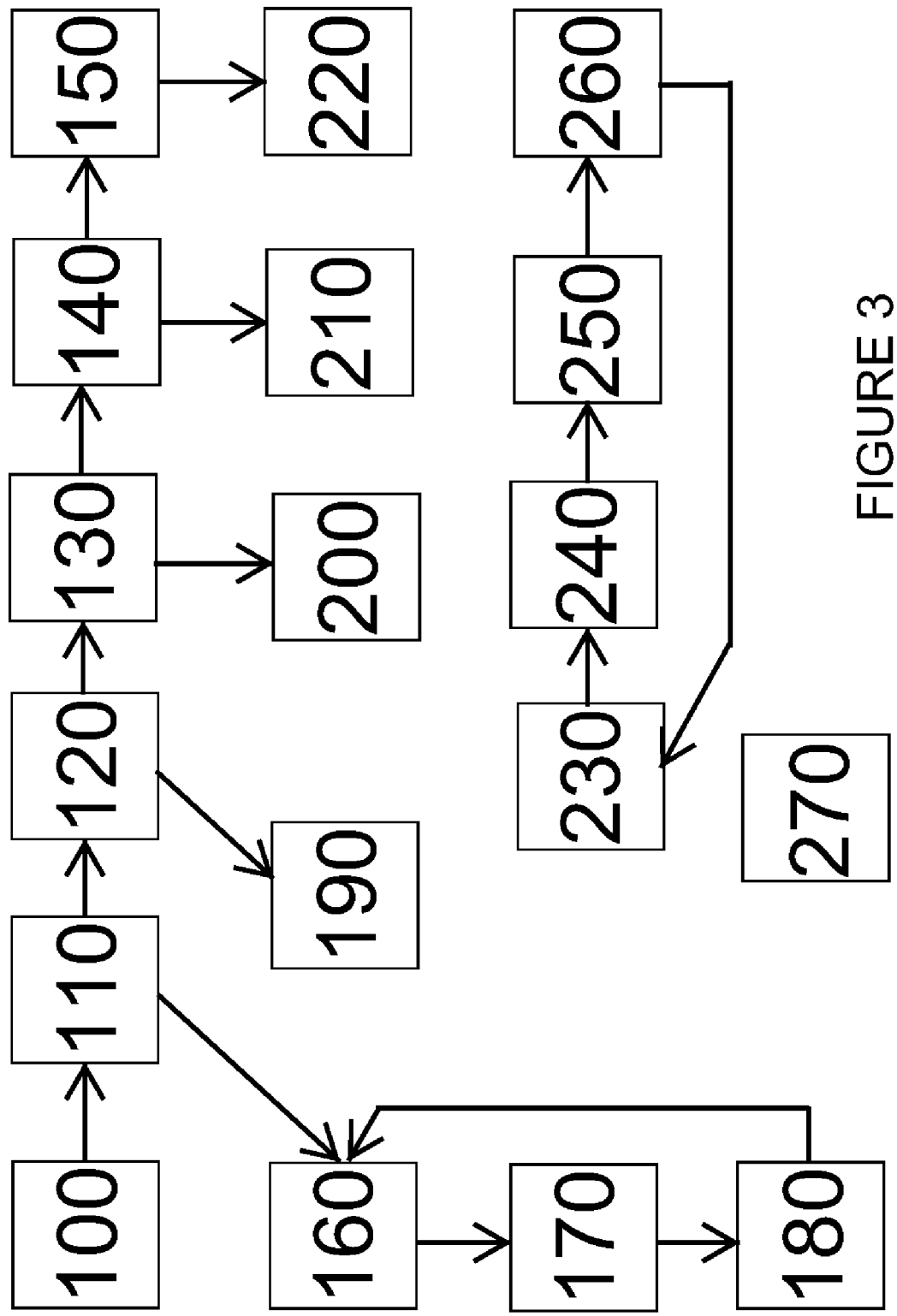
FIG. 3 is a flow chart of the workings related to the display interface of the present invention.

FIG. 3 depicts a flow chart describing an embodiment of the present invention in terms of an example of how a user may scroll through an embodiment of the display interface (20) and view various elements. It is important to note, that other display elements leading a user to ultimately view data in engineering units or other digital value may also be displayed in the display interface (20), and the flow chart in FIG. 3 is merely an example of an embodiment of this element.

The first item a user may view after the present invention is powered on is a screen stating the text, "passed self test" (100). The self test is an automatic function after initial powering up to confirm that all systems of the PLC and display interface (20) of the present invention are functioning as expected. After confirmation of "passed self test (100)," the user may hold down the panel button (30) as described in FIG. 1. When the user holds down the panel button (30), he or she will be able to cycle through the primary screens of the present invention. In order of this embodiment of the present invention if the user scrolls all the way through, he or she will see "display setup info"

(110), "display status info" (120), "display units decimal counts" (130), "display units hex counts" (140) and "display units +/−V, mA, V" (150).

The "display status info" (120) screen may lead a user to an informational screen declaring an "end of status menu list" (190). The process of leading users to the secondary displays is as described in FIG. 1 in regard to holding the panel button (30) down until the scroll reaches the desired point. When that happens, the user may release the panel button (30) and that particular screen ill have been selected, thus leading the user to a secondary display. For example, the "display units decimal counts" (130) as seen in FIG. 3 may lead a user to a secondary display featuring units in decimal counts (200). The "display units hex counts" (140) will lead a user to a secondary display showing units in hex counts (210). The "display units +/−V, mA, V" (150) may lead a user to a secondary display featuring voltage and mA units (220).

The "display setup info" (110) leads a user to a set of auto-cycling screens that will permit the user to view or hear various data (depicted as screens visually, or sections audibly) to present information relating to the setup and propagation of the present invention. In FIG. 3, it can be seen that the "display setup info" (110) may lead a user to a forward reverse screen (160), voltage and milliamp screen (170) and a channel enabler screen (180). Once the auto-scanning process completes itself in these screens, a user will again be able to view the process from the beginning.

An additional embodiment of the present invention, as seen in FIG. 3, revolves around the presentation of error messages. An embodiment of the present invention is configured to insert error messages to be viewed on the display/user interface (20) if there is a deficiency in the PLC or overall data conversion and display process. In one embodiment of the present invention, a view will be notified on the display interface (20) whether there is a missing external 24VDC element (230), self test fail, replace module (240) or missing configuration data (250). Since there may be multiple errors, the conclusion of the error screens scroll will display a message stating an "end of status menu list" (260). From there, the user may scroll back (via verbal instruction, or via the panel button (30)) to the beginning of the error thread. In addition, a fault message screen (270) may appear in place of data in the event of a problematic condition. For example, an embodiment of the present invention is preferably configured to declare that an input signal is "over" the maximum detectable by the module or "under", meaning the voltage or current input signal is at 0. An "open" message may indicate that the input signal is less than a specified current level. A "spare" message may indicate that an input is not being used.

It should be understood that the present invention may employ an external display, and that it is configured to display, non-invasively, by the display interface, the converted practical data output in real-time by directly connecting the I/O card with sensors built into an automation system employing engineering units or digital counts such that a user can monitor the practical data output via the display interface (which may be a remote display) wherein parts of the automation system remain in the automation system during the direct communication and are not taken out to be transferred to an external monitoring device for determining whether the automation system is running properly.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

We claim:

1. A method for monitoring practical data of controllers of an automation system by a programmable logic controller (PLC), comprising:
   converting, by an I/O card, practical data output received from sensors of the automation system into digital data;
   arranging the I/O card to be in in direct communication with a data reporting interface without connecting to a central processing unit of the PLC by connecting the I/O card and the data reporting interface directly via a circuit board without any other intermediate elements;
   transmitting, by the I/O card, converted practical data output to a central processing unit of the PLC and the data reporting interface;
   reporting non-invasively, by the data reporting interface, the converted practical data output in real-time by directly connecting the I/O card with the sensors built into the automation system employing engineering units or digital counts such that a user can monitor the practical data output via the data reporting interface;
   directly connecting the data reporting interface and the I/O card without employing additional external elements;
   directly connecting the I/O card and the sensors without employing additional external elements; and
   determining, by the user, desired practical data using the data reporting interface and outputting said determined practical data in engineering units or digital counts.

2. The method of claim 1, wherein said arranging the I/O card to be in in direct communication with a data reporting interface without connecting to a central processing unit of the PLC by connecting the I/O card and the data reporting interface directly via a circuit board without any other intermediate elements is connecting the I/O card and the data reporting interface directly via a wire.

3. The method of claim 1, wherein said arranging the I/O card to be in in direct communication with a data reporting interface without connecting to a central processing unit of the PLC by connecting the I/O card and the data reporting interface directly via a circuit board without any other intermediate elements is connecting the I/O card and the data reporting interface directly wirelessly.

4. The method of claim 1, wherein said arranging the I/O card to be in in direct communication with a data reporting interface without connecting to a central processing unit of the PLC by connecting the I/O card and the data reporting interface directly via a circuit board without any other intermediate elements is connecting the I/O card and the data reporting interface directly wirelessly, chosen from the group: Bluetooth, Wi-Fi, near field communication, electromagnetic.

5. The method of claim 1, wherein the reporting interface is chosen from the group: display screen, speaker, wireless interface, wired interface.

6. The method of claim 1, further comprising scrolling and holding a button of the display interface, various menu options displayed on the display interface to determine and view the desired practical data output by the user in a different unit or count.

7. The method of claim 1, further comprising displaying the practical data output in a different unit or count by releasing the button of the display interface by the user when the corresponding menu option is selected during the scrolling.

8. The method of claim 1, wherein parts of the automation system remain in the automation system during the direct connection and are not taken out to be transferred to an external monitoring device for determining whether the automation system is running properly.

9. The method of claim 1, wherein the automation system is determined to be running properly without removing any parts of the automation system.

10. The method of claim 1, wherein said directly connecting the data reporting interface and the I/O card without employing additional external elements, the external elements chosen from the group: meters, cables, device connections, other external elements.

11. The method of claim 1, wherein said directly connecting the I/O card and the sensors without employing additional external elements, the external elements chosen from the group: meters, cables, device connections, other external elements.

12. A method for monitoring practical data of controllers of an automation system by a programmable logic controller (PLC), comprising:
    arranging an I/O card to be in direct communication with a display interface without connecting to a central processing unit of the PLC by connecting the I/O card and the display interface directly via a circuit board with a wire connection without any other intermediate elements;
    displaying non-invasively, by the display interface, the converted practical data output in real-time by directly connecting the I/O card with sensors built into an automation system employing engineering units or digital counts such that a user can monitor the practical data output via the display interface wherein parts of the automation system remain in the automation system during the direct communication and are not taken out to be transferred to an external monitoring device for determining whether the automation system is running properly;
    preventing corrupted and skewed data from being displayed on the display interface by directly connecting the display interface, I/O card, and the sensors built into the automation system without employing additional external elements;
    scrolling, by clicking and holding a button of the display interface, various menu options displayed on the display interface to determine and view desired practical data output by the user in a different unit or count; and
    displaying the practical data output in the different unit or count by releasing the button of the display interface by the user when the corresponding menu option is selected during the scrolling.

13. A method for monitoring practical data of controllers of an automation system by a programmable logic controller (PLC), comprising:
    arranging the I/O card to be in in direct communication with a data reporting interface without connecting to a central processing unit of the PLC by connecting the I/O card and the data reporting interface directly via a circuit board without any other intermediate elements;
    reporting non-invasively, by the data reporting interface, the converted practical data output in real-time by directly connecting the I/O card with the sensors built into the automation system employing engineering units or digital counts such that a user can monitor the practical data output via the data reporting interface;
    directly connecting the data reporting interface and the I/O card without employing additional external elements; and
    directly connecting the I/O card and the sensors without employing additional external elements.

* * * * *